United States Patent
Vaze et al.

(10) Patent No.: US 11,047,517 B2
(45) Date of Patent: Jun. 29, 2021

(54) MODULAR VACUUM INSULATED PIPING

(71) Applicants: Aditya Vaze, Williamsville, NY (US); Seth A. Potratz, Grand Island, NY (US)

(72) Inventors: Aditya Vaze, Williamsville, NY (US); Seth A. Potratz, Grand Island, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 0 days.

(21) Appl. No.: 16/442,816

(22) Filed: Jun. 17, 2019

(65) Prior Publication Data

US 2020/0132243 A1 Apr. 30, 2020

Related U.S. Application Data

(60) Provisional application No. 62/753,244, filed on Oct. 31, 2018.

(51) Int. Cl.
| | |
|---|---|
| *F16L 59/065* | (2006.01) |
| *F16L 59/02* | (2006.01) |
| *F16L 53/32* | (2018.01) |

(52) U.S. Cl.
CPC .......... *F16L 59/065* (2013.01); *F16L 53/32* (2018.01); *F16L 59/026* (2013.01); *F16L 59/028* (2013.01)

(58) Field of Classification Search
CPC ....... F16L 59/026; F16L 59/028; F16L 59/06; F16L 59/065; F16L 59/08; F16L 59/12;
(Continued)

(56) References Cited

U.S. PATENT DOCUMENTS

| | | |
|---|---|---|
| 3,122,520 A | 2/1964 | Lentz et al. |
| 3,207,533 A * | 9/1965 | Van Gundy et al. ........................ F16L 59/065 285/31 |

(Continued)

FOREIGN PATENT DOCUMENTS

| | | |
|---|---|---|
| DE | 10114633 A1 | 9/2002 |
| DE | 10259551 A1 | 7/2004 |

(Continued)

OTHER PUBLICATIONS

S. J. Gregg et al.; "Adsorption, Surface Area and Porosity"; Academic Press, New York, 1991 (1982); pp. 285-286.

*Primary Examiner* — William M McCalister
(74) *Attorney, Agent, or Firm* — Robert J. Hampsch

(57) ABSTRACT

A modular, aerogel-based vacuum insulated pipe section comprising an outer conduit; an inner conduit concentrically disposed within the outer conduit with aerogel insulation and a condensable gas being disposed in the insulation space between the concentric conduits. As a stand-alone pipe section, the insulation space is at a pressure within the range of from about 100 microns Hg to about 1000 microns Hg. However, in operation, when a cryogenic fluid is traversing the inner conduit, the condensable gas condenses and the pressure within the insulation space is further reduced to range of from about 1 microns Hg to about 5 microns Hg. The vacuum insulated pipe section further includes a coupling arrangement disposed on a first end of the inner conduit and a second end of the inner conduit, the coupling arrangement configured to engage or mate with a corresponding end of another modular vacuum insulated pipe section.

9 Claims, 4 Drawing Sheets

(58) Field of Classification Search
CPC ..... F16L 59/141; F16L 59/143; F16L 59/184; F16L 53/32
See application file for complete search history.

(56) References Cited

U.S. PATENT DOCUMENTS

| | | | |
|---|---|---|---|
| 3,812,886 A | | 5/1974 | Hallwood |
| 3,843,171 A | * | 10/1974 | Hewlett ................ F16L 59/065 285/98 |
| 3,885,595 A | * | 5/1975 | Gibson ................ F16L 59/188 138/155 |
| 4,332,401 A | * | 6/1982 | Stephenson ............ F16L 59/21 138/149 |
| 4,447,345 A | | 5/1984 | Kummermehr et al. |
| 4,606,196 A | | 8/1986 | Acharya et al. |
| 4,924,679 A | | 5/1990 | Brigham et al. |
| 5,386,706 A | | 2/1995 | Bergsten et al. |
| 6,010,762 A | | 1/2000 | Smith et al. |
| 6,068,882 A | | 5/2000 | Ryu |
| 6,216,745 B1 | | 4/2001 | Augustynowicz et al. |
| 6,257,282 B1 | | 7/2001 | Emmer et al. |
| 6,598,283 B2 | | 7/2003 | Rouanet et al. |
| 6,658,863 B2 | | 12/2003 | Beck et al. |
| 6,670,402 B1 | | 12/2003 | Lee et al. |
| 6,967,051 B1 | | 11/2005 | Augustynowicz et al. |
| 7,305,837 B2 | | 12/2007 | White |
| 8,267,433 B2 | * | 9/2012 | Lange ................... F16L 39/005 285/123.1 |
| 2002/0089177 A1 | | 7/2002 | Bonn |
| 2004/0087670 A1 | | 5/2004 | Lee et al. |
| 2008/0169037 A1 | * | 7/2008 | Ziegler ................ F16L 59/188 138/149 |
| 2008/0314455 A1 | | 12/2008 | Jibb et al. |
| 2019/0331268 A1 | * | 10/2019 | Inomata ................ F16L 59/141 |

FOREIGN PATENT DOCUMENTS

DE 10259553 A1 7/2004
EP 1431686 A1 6/2004

* cited by examiner

MODULAR VACUUM INSULATED PIPING

CROSS REFERENCE TO RELATED APPLICATIONS

The present application claims the benefit of and priority to U.S. provisional patent application Ser. No. 62/753,244 filed on Oct. 31, 2018, the disclosures of which are incorporated by reference herein.

TECHNICAL FIELD

The present invention relates generally to insulation systems intended for use at cryogenic temperatures and more particularly, to vacuum insulated pipe sections and assembled vacuum insulated piping systems or arrangements, preferably with aerogel based insulation.

BACKGROUND

Conventional cryogenic vacuum insulation systems for double walled piping systems require a vacuum, typically less than 1 micron Hg at 0° C. The purpose of the vacuum is to reduce gas conduction/convection so as to maintain the fluids contained in concentric conduits or other double walled piping systems at cryogenic temperatures, typically 170 Kelvin or below. The vacuum required for conventional vacuum insulation systems for double walled piping systems is expensive to produce, requiring long pump out times at elevated temperatures when assembling the vacuum insulated piping system in the field. This results in a high manufacturing cost for such field built vacuum insulated piping systems.

Current methods of assembling vacuum insulated piping systems generally consists of the following six steps: (a) fabricating spools of piping; (b) leak testing; (c) pipe spool storage and transport; (d) field staging; (e) field assembly, welding and testing; and (f) final vacuum pull-down. During construction of a cryogenic air separation plant, the costs associated with the field work associated with a vacuum insulated piping system or arrangement, namely steps (c) through (f) above, can often run near to or in excess of 50% of the total installed cost of the vacuum insulated piping system. The field-based vacuum pull-down step alone is expensive and very time consuming. In many instances of installing a vacuum insulation piping system for a cryogenic air separation plant, the field vacuum work can take between 2 to 7 days depending on the overall length and geometries of the vacuum insulated piping system or arrangement which translates to higher installation costs. Moreover, from a quality standpoint, the vacuum pull-down step as well as overall quality of the field assembly of the vacuum insulated piping depends on the ambient atmospheric conditions at the installation site and other site variables. As a result, the vacuum levels for vacuum insulation piping systems where the vacuum is obtained in the field are somewhat inconsistent.

What is needed, therefore, is a system and method for reducing the costs of installing vacuum insulated piping systems while also improving the quality of the vacuum and the corresponding performance of the installed vacuum insulated piping systems.

SUMMARY OF THE INVENTION

The present invention may be characterized as a modular vacuum insulated pipe section comprising: (i) an outer conduit; (ii) an inner conduit configured to contain a cryogenic fluid, the inner conduit concentrically disposed within the outer conduit and defining an insulation space between an outer surface of the inner conduit and an inner surface of the outer conduit; (iii) an insulation material disposed in the insulation space, wherein the insulation filled insulation space is at a pressure within the range of from about 100 microns Hg to about 1000 microns Hg; (iv) a sealing arrangement comprising a first seal member disposed proximate a first end of the outer conduit and a second seal member disposed proximate a second end of the outer conduit, the sealing arrangement configured to seal the insulation space from the external atmosphere; (v) a coupling arrangement disposed on a first end of the inner conduit and a second end of the inner conduit, the coupling arrangement configured to engage or mate with a corresponding end of another modular vacuum insulated pipe section; (vi) a condensable gas also disposed in the sealed insulation space, wherein the condensable gas is configured to condense at temperatures below about 190 Kelvin; and (vii) one or more valves disposed on the outer surface of the outer conduit, the one or more valves configured to be in fluid communication with the insulation space, the one or more valves configured to facilitate pressurization and depressurization of the insulation space and to facilitate introduction of the condensable gas into the insulation space.

The present invention may also be characterized as a modular vacuum insulated pipe system comprising a plurality of the above-described modular vacuum insulated pipe sections, preferably 100 feet or less in length and wherein in operation, when a cryogenic fluid is traversing the inner conduits of the plurality of coupled modular vacuum insulated pipe sections, the condensable gas condenses and the pressure within the insulation filled insulation space in each of the plurality of modular vacuum insulated pipe sections is reduced to a pressure range of between about 1 micron Hg and 5 microns Hg.

In some embodiments, the insulation material of the modular vacuum insulated pipe sections comprises an aerogel-based insulation, preferably silica aerogel while the condensable gas is carbon dioxide. Some embodiments may also include a radiation shield as well as a resin impregnated fiber support disposed between the outer surface of the inner conduit and the inner surface of the outer conduit.

The sealing arrangement of each of the modular vacuum insulated piper sections preferably comprises: a first sealing flange attached to the outer surface of the inner conduit and the inner surface of the outer conduit proximate the first end of the outer conduit and a second sealing flange sealably attached to the outer surface of the inner conduit and the inner surface of the outer conduit proximate the second end of the outer conduit. The first sealing flange and the second sealing flange are configured for sealing the insulation space from the external atmosphere.

The preferred coupling arrangement of each of the modular vacuum insulated piper sections may comprise a bayonette joint or similar coupling means having a projecting section disposed on the first end of the inner conduit and sealably engaging therewith and a distal end extending axially from the first end of the inner conduit. The bayonette joint or similar coupling means also includes a receiving section disposed on the second end of the inner conduit. The receiving section also has a distal end extending axially into the inner conduit as well as a proximal end defining an opening that is configured to receive another projecting section of another modular vacuum insulated piper section.

BRIEF DESCRIPTION OF THE DRAWINGS

While the present invention concludes with claims distinctly pointing out the subject matter that Applicants regard as their invention, it is believed that the invention will be better understood when taken in connection with the accompanying drawings in which:

FIG. 6A is an illustration of two adjacent modular vacuum insulated piping sections configured to coupled together using a bayonette type joint while

DETAILED DESCRIPTION

Figure 1:
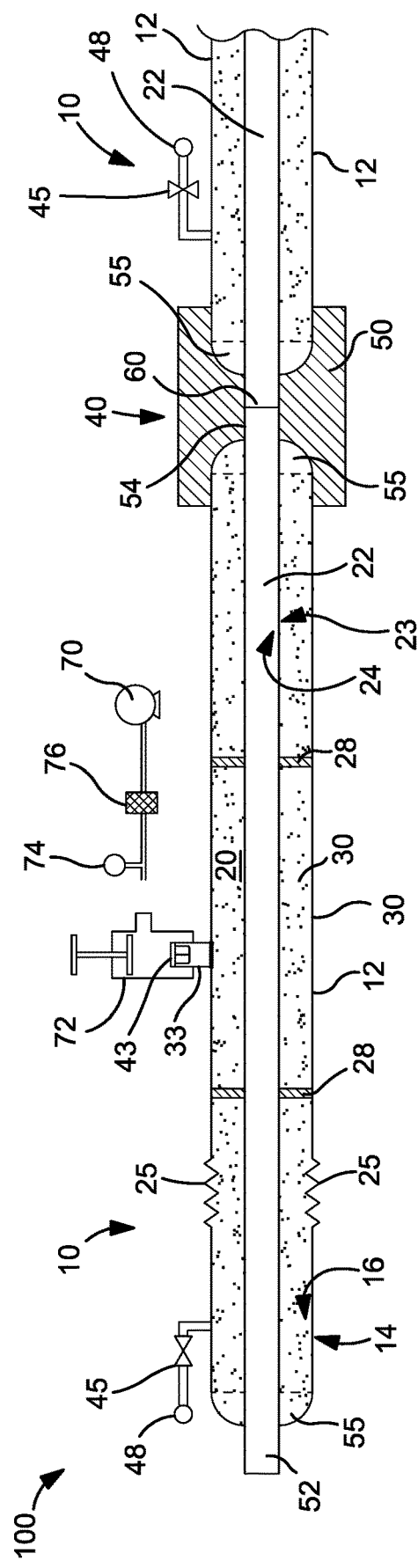
FIG. 1 is a side cross-sectional view of an embodiment of the modular vacuum insulated piping system in accordance with embodiments of the present invention.

The presently claimed system and methods address the above-identified needs by fabricating individual double walled pipe sections with insulation, preferably aerogel based insulation, and designed to operate a vacuum level of between about 1 micron Hg and 300 micron Hg. The individual modular pipe sections are subsequently transported to the construction site where an aerogel-based vacuum insulated piping system is assembled by coupling a plurality of the pre-fabricated vacuum insulated pipe sections.

This pre-fabricated modular pipe section approach ensures the quality of each pipe section is uniform and consistent, including the construction of each pipe section as well as the vacuum system within each pipe section. Since the vacuum pull down of each pipe section occurs in the shop fabrication facility, the amount of time spent in the field installing or assembling the vacuum insulated piping system as well as the associated field installation costs and risks are minimized. Specifically, the costs and risks associated with handling the insulation materials, such as aerogel insulation in the field as well as the time and equipment associated with the vacuum pull-down in the field are eliminated.

Turning now the drawings, and particularly FIGS. 1-4, there is shown different views of a modular vacuum insulated pipe system 100 and modular vacuum insulated pipe section 10. The modular vacuum insulated pipe section 10 includes an outer conduit 12 having an outer surface 14 and an inner surface 16 as well as an inner conduit 22 concentrically disposed within the outer conduit 10. The inner conduit 22 also has an outer surface 23 and an inner surface 24. The concentric arrangement between the inner conduit 22 and the outer conduit 12 defines an insulation space 20 between the outer surface 23 of the inner conduit and the inner surface 16 of the outer conduit 12. Also disposed along the length of the pipe section 10 within the insulation space 20 is preferably one or more resin impregnated fiber supports 28 configured to provide structural integrity of the pipe section 10 and maintain the spacing between the inner conduit 22 and outer conduit 12. In some embodiments, an expansion bellows 25 or other means to allow thermally induced contraction and/or expansion of the conduits relative to the other conduits.

An insulation material 30, such as aerogel insulation is also preferably disposed in the insulation space 20. The preferred insulation material 30 is a metal oxide based aerogel material, such as a silica aerogel. The aerogel insulation may be supplied in a solid monolithic form or as a composite aerogel blanket which incorporates fibrous batting. Alternatively, it is contemplated to use a combination of aerogel composite blankets and aerogel material. Both aerogel materials and aerogel blankets have highly desirable properties including low density and very low thermal conductivity. The thermal conductivity of the aerogel insulation is preferably equal to or less than 3 mW/mK at a pressure greater than about 10 microns Hg.

If using aerogel particles as the insulating medium, the aerogel particles preferably have a density between about 0.05 g/cm$^3$ to about 0.15 g/cm$^3$ and has a surface area preferably of at least about 200 m$^2$/g. The preferred aerogel particles also have an average diameter of between about 0.5 mm to about 5 mm. Aerogel blankets also have the desirable properties of low density and very low thermal conductivity. In such aerogel blankets, the aerogel may be incorporated into a blanket form by mixing it with fibers such as polyester, fiberglass, carbon fiber, silica or quartz fibers, depending upon the application. The composite aerogel/fiber blanket is then wrapped tightly around the inner pipe in a series of layers. In this layered configuration it is possible to also provide radiation shielding layer 32 by interleaving thin sheets of a low emissivity material, typically a polished metal such as copper or aluminum.

Figure 6A:
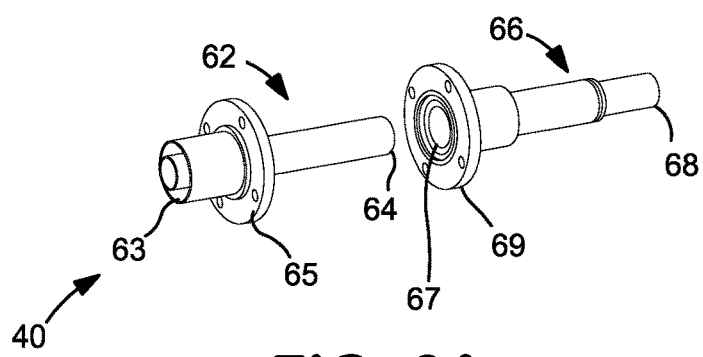
Figure 6B:
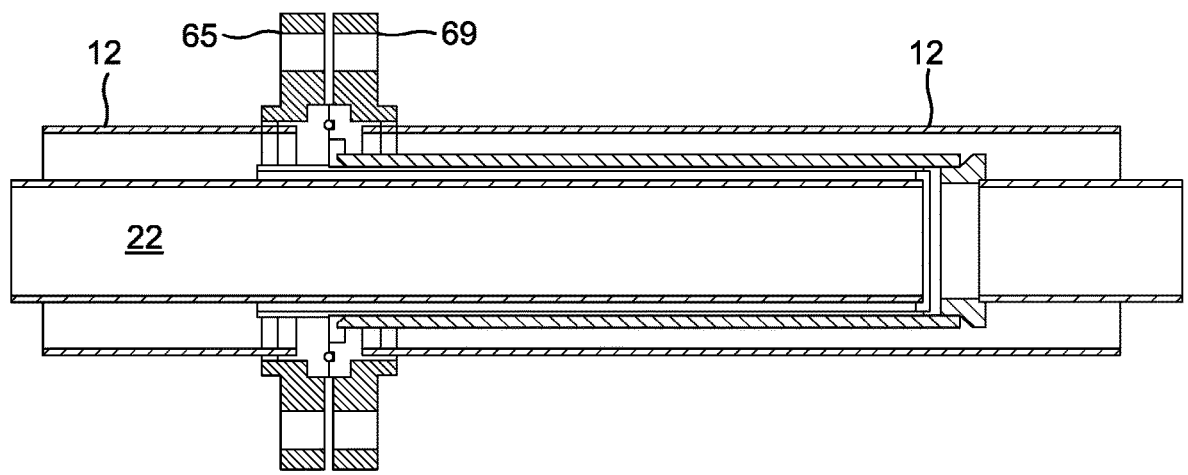
FIG. 6B shows a cross section of the adjacent sections coupled together using the bayonette joint of FIG. 6A.

Turning now to FIGS. 1, 5, 6A and 6B the modular vacuum insulated pipe section 10 also includes a coupling arrangement 40 at each end of the inner conduit 22. The illustrated coupling arrangement 40 shown in FIG. 5 includes a first protruding end 52 of the inner conduit 22 and a corresponding protruding end 54 disposed on the other end of the inner conduit 22. End caps 55 are attached to each end of the outer conduit 12 as well as to the outer surface of the inner conduit proximate such end to seal the insulation space 20 with the protruding ends 52, 54 of the inner conduits 22 extending past the end caps 55. An alternate embodiment of the coupling arrangement 40 is generally shown in FIGS. 6A and 6B as an example of a bayonette joint that includes a projecting section 62 disposed on the first end of the inner conduit 22 and a corresponding receiving section 66 disposed on the second or other end of the inner conduit 22. At the juncture 60 of two adjacent modular vacuum insulated pipe sections 10 where there are gaps between the annular spaces of the connected pipe sections, it may be preferably to use external insulation, such as a permanent or removeable solid insulation cover 50 or intermediate vacuum can to surround and further insulate the coupled pipe sections 10, as generally depicted in FIG. 1.

In the alternate coupling arrangement 40 depicted in FIGS. 6A and 6B, the projecting section 62 has a proximal end 63 that is configured to sealably engage the inner conduit 22 and a distal end 64 extending axially from the first end of the inner conduit 22. The projecting section 62 also has a sealing flange 65 configured for sealing one end of the insulation space 20 proximate the first end of the inner conduit 22. The receiving section 66 is disposed on the second or other end of the inner conduit 22. The receiving section 66 also has a proximal end 67 and a distal end 68 which extends axially into the inner conduit 22. The receiving section 66 also includes another sealing flange 69 configured for sealing the other end of the insulation space 20, proximate the second end of inner conduit 22.

The projecting section 62 also defines a first flow path from the distal end 64 of the projecting section 62 to the interior of the inner conduit 22 whereas the receiving section 66 defines a second flow path from its distal end 68 to the interior of the inner conduit 22. The proximal end 67 of the receiving section 66 is configured to receive a projecting section of another modular vacuum insulated pipe section. Likewise, the distal end 64 of the projecting section 62 is configured to engage a receiving section of another modular vacuum insulated pipe section. Given the first and second flow paths, a cryogenic fluid can freely flow from a first modular vacuum insulated pipe section to an adjacent and mated second modular vacuum insulated pipe section and on to another adjacent and mated third modular vacuum insulated pipe section, and so on.

Figure 2:
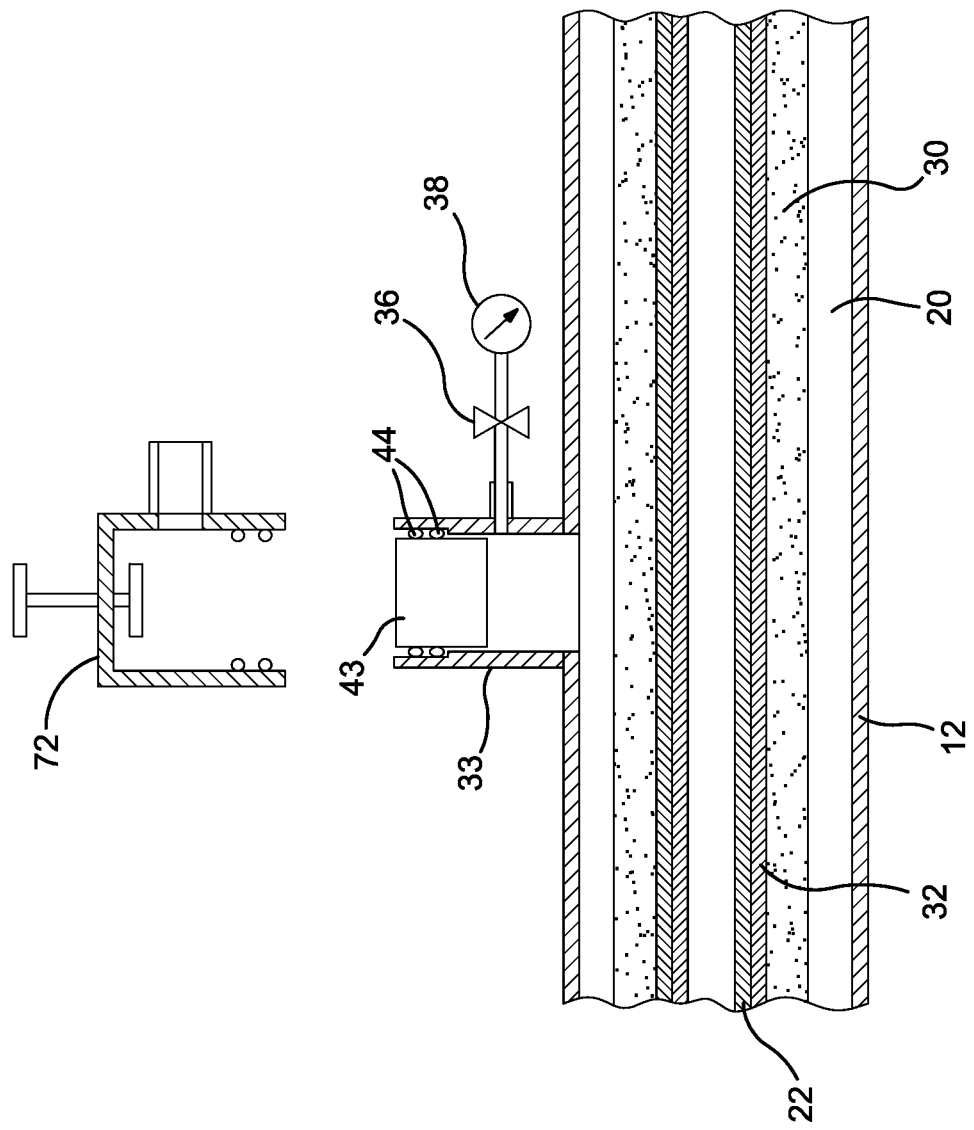
FIG. 2 is an illustration of generally depicting a partial sectional view of the arrangement of components in the modular vacuum insulated piping section in accordance with various embodiments of the invention.
Figure 3:
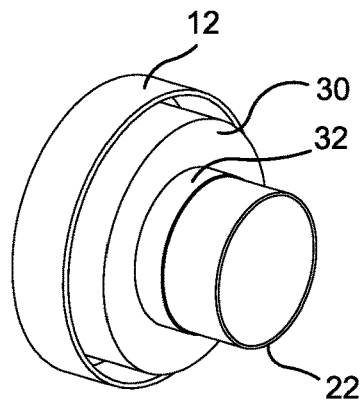
FIG. 3 is an illustration of generally depicting an arrangement of selected components of the modular vacuum insulated piping section in accordance with various embodiments of the invention.
Figure 4:
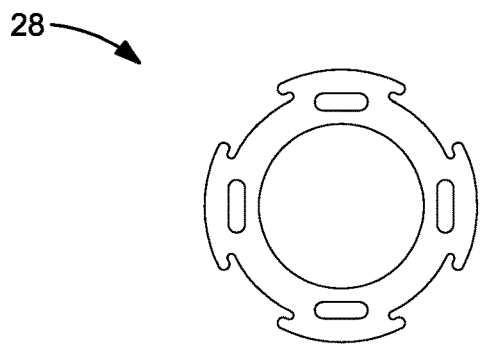
FIG. 4 is a drawing showing a plan view of a resin impregnated fiber support used in the modular vacuum insulated piping section of FIGS. 1 and 2.
Figure 5:
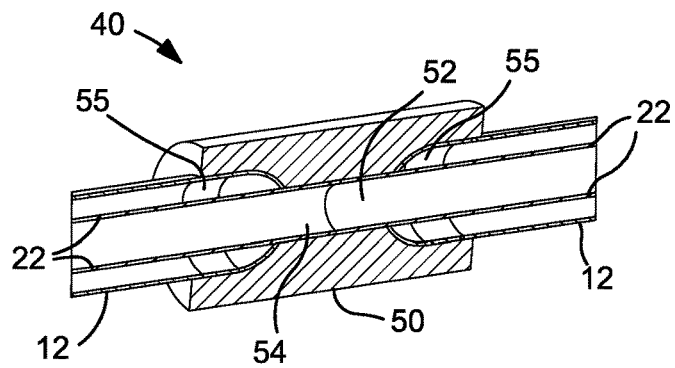
FIG. 5 is an illustration showing a bayonette joint contemplated for use as the coupling arrangement of the present modular vacuum insulated piping system.

When the insulation space is sealed and filled with the suitable insulation material 30, such as aerogel insulation, a moderate vacuum is produced within the insulation space 20 by vacuum pumping the insulation space 20 via a vacuum port 33, preferably to a pressure of under 1000 microns Hg, more preferably to a pressure of under 300 microns Hg, and most preferably to a pressure of about 100 microns Hg. When the modular vacuum insulated pipe section 10 is not being vacuum pumped, a plug 43 with O-ring seals 44 is sealably disposed into the vacuum port 33. The vacuum port 33 may optionally include an isolation valve 36 and vacuum pressure gauge 38 as depicted in FIG. 2. When the modular vacuum insulated pipe section 10 is being vacuum pumped, a vacuum connector 72 is engaged with the vacuum port 33. A vacuum pump 70 together with a vacuum gauge 74 and particulate filter 76 are connected to the vacuum port 33 of the modular vacuum insulated pipe section 10 via the vacuum connector 72.

During the manufacture of the modular vacuum insulated pipe section, the aerogel containing insulation space is purged and cooled. During the purge process, a vacuum pump arrangement (shown as vacuum connector, 72, vacuum pump 70 with vacuum gauge 74 and particulate filter 76) is used initially to evacuate the insulation space to a pressure below about 1000 microns Hg and more preferably between 100 microns Hg and 1000 microns Hg in order to remove any moisture or heavy hydrocarbons in the aerogel material. The aerogel containing insulation space then undergoes at least one purge cycle that includes a pressurization step and a depressurization step. The pressurization step preferably comprises introducing a condensable gas such as carbon dioxide gas to the sealed and aerogel containing insulation space via another port equipped with another isolation valve 45 and vacuum pressure gauge 48. Other condensable gases which may be used during the pressurization step include nitrous oxide, nitrogen, oxygen and argon. The pressurization step may be to pressures as high as the pressure rating of the outer wall. The depressurization step may reduce the pressure to a range of about 100 microns Hg to 1000 microns Hg. Preferably the aerogel containing insulation space undergoes at least two such pressurization and depressurization cycles and may undergo up to ten such cycles. Preferably, the final pressure of the aerogel containing insulation space following the last depressurization cycle is in the range of about 100 microns Hg to 1000 microns Hg. Optionally, the modular vacuum insulated pipe section may also be heated during such cycles using an external heat source (not shown) to accelerate the outgassing and desorption of the condensable gases.

In operation, the outer surface of the inner conduit is cooled to a temperature less than about 190 Kelvin as a result of a cryogenic liquid flowing through the inner conduit. Suitable cryogen liquids include liquid nitrogen, liquid oxygen, liquid argon, and liquefied natural gas, or other cryogenic liquids. As the outer surface of the inner conduit is cooled to a temperature at or below the freezing point of the condensable gas at the prevailing pressure, the condensable gas, e.g. carbon dioxide, will migrate to the cooled surface and freeze, further reducing the pressure in the insulation space. In this manner, the vacuum pressure of the modular vacuum insulated pipe section during operation falls to a pressure of less than 10 microns Hg and preferably to a final operating vacuum pressure between 1 micron Hg and 5 microns Hg.

The preferred length of modular vacuum insulated pipe section is less than about 100 feet long to facilitate easy storage and subsequent transport to the construction site for assembly of the vacuum insulated pipe system or arrangement that comprises a plurality of the above-described modular vacuum insulated pipe sections.

Although the present invention has been discussed with reference to one or more preferred embodiments, as would occur to those skilled in the art that numerous changes and omissions can be made without departing from the spirit and scope of the present inventions as set forth in the appended claims.

What is claimed is:

1. A modular vacuum insulated pipe section comprising:
an outer conduit;
an inner conduit configured to contain a cryogenic fluid, the inner conduit concentrically disposed within the outer conduit and defining an insulation space between an outer surface of the inner conduit and an inner surface of the outer conduit;
an aerogel insulation material and a condensable gas disposed in the insulation space prior to field installation, wherein the insulation filled insulation space is at a pressure within the range of from about 100 microns Hg to about 1000 microns Hg prior to field installation, and wherein the condensable gas is configured to condense at temperatures below about 190 Kelvin;
a sealing arrangement comprising a first seal member disposed proximate a first end of the outer conduit and configured to seal the insulation space from the external atmosphere proximate the first end, and a second seal member disposed proximate a second end of the outer conduit and configured to seal the insulation space from the external atmosphere proximate the second end; and;
one or more valves disposed on the outer surface of the outer conduit, the one or more valves configured to be in fluid communication with the insulation space, the one or more valves configured to facilitate pressurization and depressurization of the insulation space during fabrication of the pipe section and to facilitate introduction of the condensable gas into the insulation space during fabrication of the pipe section;
wherein the pipe section is configured to be coupled to a second modular vacuum insulated pipe section during installation of a piping run in the field.

2. The modular vacuum insulated pipe section of claim 1, wherein the pipe section is configured to be coupled to the second modular vacuum insulated pipe section via a bayonette joint coupling arrangement, and the first end of the pipe section further includes a male section of the bayonette joint coupling arrangement having a projecting section and the second end of the pipe section further includes a female section of the bayonette joint having a receiving section.

3. The modular vacuum insulated pipe section of claim 1, wherein the insulation material is in the form of an aerogel blanket.

4. The modular vacuum insulated pipe section of claim 3, wherein the aerogel blanket comprises aerogel combined with fibrous batting.

5. The modular vacuum insulated pipe section of claim 1 wherein the condensable gas is carbon dioxide.

6. The modular vacuum insulated pipe section of claim 1, further comprising a radiation shield disposed within the insulation space.

7. The modular vacuum insulated pipe section of claim 1, further comprising a resin impregnated fiber support disposed between the outer surface of the inner conduit and the inner surface of the outer conduit.

8. The modular vacuum insulated pipe section of claim 1, wherein the length of the pipe section is less than or equal to 100 feet.

9. The modular vacuum insulated pipe section of claim 1, wherein the outer conduit and the inner conduit comprise a double-walled conduit and the insulation space is a space between an inner wall and an outer wall of the double-walled conduit.

\* \* \* \* \*